(12) United States Patent
van Diggelen et al.

(10) Patent No.: US 8,514,126 B2
(45) Date of Patent: *Aug. 20, 2013

(54) METHOD AND APPARATUS FOR MONITORING THE INTEGRITY OF SATELLITE TRACKING DATA USED BY A REMOTE RECEIVER

(75) Inventors: Frank van van Diggelen, San Jose, CA (US); David Lundgren, Mill Valley, CA (US); Charles Abraham, Los Gatos, CA (US)

(73) Assignee: Global Locate, Inc., San Jose, CA (US)

( * ) Notice: Subject to any disclaimer, the term of this patent is extended or adjusted under 35 U.S.C. 154(b) by 535 days.

This patent is subject to a terminal disclaimer.

(21) Appl. No.: 12/539,258

(22) Filed: Aug. 11, 2009

(65) Prior Publication Data
US 2010/0156714 A1    Jun. 24, 2010

Related U.S. Application Data

(63) Continuation of application No. 11/289,959, filed on Nov. 30, 2005, now Pat. No. 7,589,667, which is a continuation of application No. 10/712,807, filed on Nov. 13, 2003, now Pat. No. 6,992,617.

(51) Int. Cl.
*G01S 19/08* (2010.01)
(52) U.S. Cl.
USPC .................................................. 342/357.45
(58) Field of Classification Search
USPC ............ 342/357.25, 357.45, 357.46, 357.58; 701/468, 469
See application file for complete search history.

(56) References Cited

U.S. PATENT DOCUMENTS

| | | | |
|---|---|---|---|
| 5,563,607 A | 10/1996 | Loomis et al. | |
| 6,067,484 A | 5/2000 | Rowson et al. | |
| 6,138,074 A | 10/2000 | Gower et al. | |
| 6,373,432 B1 | 4/2002 | Rabinowitz et al. | |
| 6,411,892 B1 | 6/2002 | van Diggelen | |
| 6,417,801 B1 | 7/2002 | van Diggelen | |
| 6,427,120 B1 | 7/2002 | Garin et al. | |
| 6,429,808 B1 | 8/2002 | King et al. | |
| 6,453,237 B1 | 9/2002 | Fuchs et al. | |
| 6,466,846 B2 | 10/2002 | Maynard | |
| 6,542,820 B2 | 4/2003 | LaMance et al. | |

(Continued)

FOREIGN PATENT DOCUMENTS

| | | |
|---|---|---|
| WO | 99/56145 | 11/1999 |
| WO | 00/75685 | 12/2000 |
| WO | WO 01/73467 A2 | 10/2001 |
| WO | WO0218968 A2 | 3/2002 |

OTHER PUBLICATIONS

First Office action for Chinese Patent Application No. 200480040184.9, Jul. 17, 2009.

(Continued)

*Primary Examiner* — Dao Phan
(74) *Attorney, Agent, or Firm* — Sterne, Kessler, Goldstein & Fox P.L.L.C.

(57) ABSTRACT

A method and apparatus for monitoring the integrity of satellite tracking data used by a remote receiver is described. In one example, a first set of satellite tracking data is received at a server. Integrity data for a second set of satellite tracking data is generated using the first set of satellite tracking data. The integrity data is then transmitted to at least one remote receiver having the second set of satellite tracking data.

18 Claims, 9 Drawing Sheets

(56) References Cited

U.S. PATENT DOCUMENTS

| | | |
|---|---|---|
| 6,782,330 B1 | 8/2004 | Clark |
| 6,826,476 B2 | 11/2004 | Ahlbrecht et al. |
| 6,992,617 B2 | 1/2006 | Diggelen et al. |
| 7,589,667 B2 * | 9/2009 | van Diggelen et al. .. 342/357.45 |
| 2002/0050944 A1 | 5/2002 | Sheynblat et al. |
| 2002/0190898 A1 | 12/2002 | Abraham et al. |
| 2003/0107513 A1 | 6/2003 | Abraham et al. |
| 2003/0151547 A1 | 8/2003 | Mauro et al. |
| 2003/0169201 A1 * | 9/2003 | Dybdal et al. ................. 342/367 |
| 2004/0088111 A1 | 5/2004 | Ahlbrecht et al. |
| 2005/0104772 A1 | 5/2005 | Diggelen et al. |
| 2006/0038719 A1 | 2/2006 | Pande et al. |
| 2006/0114150 A1 | 6/2006 | van Diggelen et al. |
| 2008/0186229 A1 | 8/2008 | van Diggelen et al. |
| 2009/0157236 A1 * | 6/2009 | Van Gaasbeck et al. ......... 701/3 |

OTHER PUBLICATIONS

International Search Report directed to related International Patent Application No. PCT/US2004/038117, mailed Apr. 18, 2005.

Written Opinion of the International Search Authority directed to related International Patent Application No. PCT/US2004/038117, mailed Apr. 18, 2005.

International Preliminary Report on Patentability of International Search Authority directed to related International Patent Application No. PCT/US2004/038117, mailed May 26, 2006.

Non-Final Rejection mailed Dec. 9, 2004 for U.S. Appl. No. 10/712,807, filed Nov. 13, 2003; 6 pages.

Final Rejection mailed May 25, 2005 for U.S. Appl. No. 10/712,807, filed Nov. 13, 2003; 5 pages.

Notice of Allowance mailed Aug. 17, 2005 for U.S. Appl. No. 10/712,807, filed Nov. 13, 2003; 4 pages.

Non-Final Rejection mailed Jul. 19, 2007 for U.S. Appl. No. 11/289,959, filed Nov. 30, 2005; 5 pages.

Non-Final Rejection mailed Mar. 21, 2008 for U.S. Appl. No. 11/289,959, filed Nov. 30, 2005; 4 pages.

Non-Final Rejection mailed Oct. 27, 2008 for U.S. Appl. No. 11/289,959, filed Nov. 30, 2005; 6 pages.

Notice of Allowance mailed May 6, 2009 for U.S. Appl. No. 11/289,959, filed Nov. 30, 2005; 4 pages.

* cited by examiner

US 8,514,126 B2

METHOD AND APPARATUS FOR MONITORING THE INTEGRITY OF SATELLITE TRACKING DATA USED BY A REMOTE RECEIVER

CROSS-REFERENCE TO RELATED APPLICATIONS

This application is a continuation of U.S. patent application Ser. No. 11/289,959, filed on Nov. 30, 2005, now U.S. Pat. No. 7,589,667, which is a continuation of U.S. patent application Ser. No. 10/712,807, filed 13 Nov. 2003, now U.S. Pat. No. 6,992,617, which are herein incorporated by reference.

BACKGROUND OF THE INVENTION

1. Field of the Invention

The present invention generally relates to satellite position location systems and, more particularly, to monitoring the integrity of satellite tracking data used by a remote receiver.

2. Description of the Related Art

Global Positioning System (GPS) receivers use measurements from several satellites to compute position. GPS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver. The GPS satellites transmit to the receivers satellite-positioning data, so called "ephemeris" data. In addition to the ephemeris data, the satellites transmit to the receiver absolute time information associated with the satellite signal, i.e., the absolute time signal is sent as a second of the week signal. This absolute time signal allows the receiver to unambiguously determine a time tag for when each received signal was transmitted by each satellite. By knowing the exact time of transmission of each of the signals, the receiver uses the ephemeris data to calculate where each satellite was when it transmitted a signal. Finally, the receiver combines the knowledge of satellite positions with the computed distances to the satellites to compute the receiver position.

More specifically, GPS receivers receive GPS signals transmitted from orbiting GPS satellites containing unique pseudo-random noise (PN) codes. The GPS receivers determine the time delays between transmission and reception of the signals by comparing time shifts between the received PN code signal sequence and internally generated PN signal sequences.

Each transmitted GPS signal is a direct sequence spread spectrum signal. The signals available for commercial use are provided by the Standard Positioning Service. These signals utilize a direct sequence spreading signal with a 1.023 MHz spread rate on a carrier at 1575.42 MHz (the L1 frequency). Each satellite transmits a unique PN code (known as the C/A code) that identifies the particular satellite, and allows signals transmitted simultaneously from several satellites to be received simultaneously by a receiver with very little interference of any one signal by another. The PN code sequence length is 1023 chips, corresponding to a 1 millisecond time period. One cycle of 1023 chips is called a PN frame. Each received GPS signal is constructed from the 1.023 MHz repetitive PN pattern of 1023 chips. At very low signal levels, the PN pattern may still be observed, to provide unambiguous time delay measurements, by processing, and essentially averaging, many PN frames. These measured time delays are called "sub-millisecond pseudoranges", since they are known modulo the 1 millisecond PN frame boundaries. By resolving the integer number of milliseconds associated with each delay to each satellite, then one has true, unambiguous, pseudoranges. The process of resolving the unambiguous pseudoranges is known as "integer millisecond ambiguity resolution".

A set of four pseudoranges together with the knowledge of the absolute times of transmissions of the GPS signals and satellite positions at those absolute times is sufficient to solve for the position of the GPS receiver. The absolute times of transmission are needed in order to determine the positions of the satellites at the times of transmission and hence to determine the position of the GPS receiver. GPS satellites move at approximately 3.9 km/s, and thus the range of the satellite, observed from the earth, changes at a rate of at most ±800 m/s. Absolute timing errors result in range errors of up to 0.8 m for each millisecond of timing error. These range errors produce a similarly sized error in the GPS receiver position. Hence, absolute time accuracy of 10 ms is sufficient for position accuracy of approximately 10 m. Absolute timing errors of much more than 10 ms will result in large position errors, and so typical GPS receivers have required absolute time to approximately 10 milliseconds accuracy or better.

It is always slow (no faster than 18 seconds), frequently difficult, and sometimes impossible (in environments with very low signal strengths), for a GPS receiver to download ephemeris data from a satellite. For these reasons, it has long been known that it is advantageous to send satellite orbit and clock data to a GPS receiver by some other means in lieu of awaiting the transmission from the satellite. This technique of providing satellite orbit and clock data, or "aiding data", to a GPS receiver has become known as "Assisted-GPS" or A-GPS.

Aiding data within an A-GPS system may be short term data, such as information to assist in satellite signal acquisition, medium term data, such as ephemeris data, or long term data, such as groups of ephemeris or other types of long term satellite orbit and clock models (generally referred to as "satellite tracking data"). For example, satellite signal acquisition assistance data is typically valid for several minutes; satellite ephemeris data is typically valid for a few hours; and long term orbit and clock data may be valid for a few days. A remote receiver may then use the aiding data to acquire satellite signals and, in some cases, compute position. Between the time that the aiding data is delivered and the time that the aiding data is used by the remote receiver, it is possible that the satellite orbit/clock data upon which the aiding data was based becomes invalid. For example, the clock within a given satellite may have drifted outside the expected range, or the orbit of a given satellite may have changed beyond the expected range. If the remote receiver uses previously obtained aiding data that is associated with invalid satellite orbit/clock data, a computed device position may be in error by a significant amount.

Therefore, there exists a need in the art for a method and apparatus that monitors the integrity of satellite aiding data delivered to remote receivers in an assisted position location system.

SUMMARY OF THE INVENTION

A method and apparatus for monitoring the integrity of satellite tracking data used by a remote receiver is described. In one embodiment of the invention, a first set of satellite tracking data is received at a server. For example, the first set of satellite tracking data may be received from one or more of a network of reference stations, a satellite control station, or other type of communication network. The satellite tracking data may comprise satellite orbit data, satellite clock data, or both. Integrity data for a second set of satellite tracking data is generated using the first set of satellite tracking data. The integrity data is then transmitted to at least one remote receiver having the second set of satellite tracking data. For example, the integrity data may identify one or more unhealthy satellites.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE INVENTION

Figure 1:
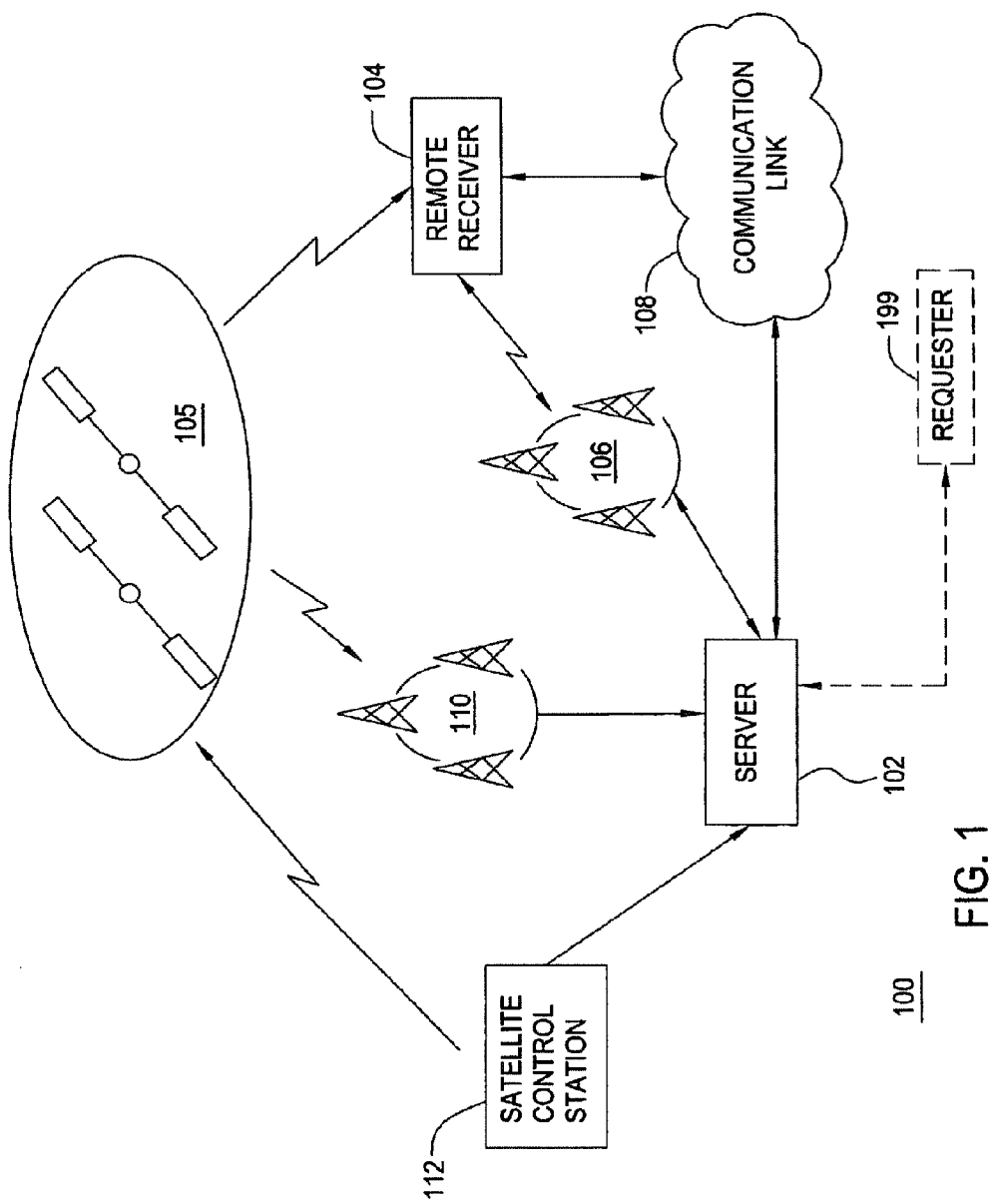
FIG. 1 is a block diagram depicting an exemplary embodiment of a position location system.

FIG. 1 is a block diagram depicting an exemplary embodiment of a position location system 100. The system 100 comprises a server 102 and a remote receiver 104. For purposes of clarity by example, the system 100 is shown with only a single remote receiver 104. It is to be understood, however, that the server 102 may be in communication with one or more remote receivers. The remote receiver 104 may be in communication with the server 102 via a wireless communication system 106 (e.g., cellular telephone network) or other type of communication link 108, such as the Internet, or both. The remote receiver 104 acquires satellite signals broadcast by a plurality of satellites 105 in a constellation and measures pseudoranges to the satellites 105 in order to locate its unknown position. For example, the remote receiver 104 may measure pseudoranges to a plurality of GPS satellites in the GPS constellation. To assist in the acquisition of satellite signals, the computation of position, or both, the remote receiver 104 receives satellite tracking data (hereinafter referred to as "aiding data") from the server 102.

In one embodiment of the invention, the remote receiver 104 uses aiding data from the server 102 to assist in acquisition of the satellite signals and transmits the measured pseudoranges to the server 102 using the wireless communication system 106. The server 102 then uses the pseudoranges to solve for the unknown position of the remote receiver 104. The position may be transmitted to the remote receiver 104 via the wireless communication system 106, or made available to a third-party requester 199 via another manner, such as through the Internet. In another embodiment, the remote receiver 104 may use the measured pseudoranges to compute its own position without transmitting the pseudoranges to the server. The remote receiver 104 uses aiding data from the server 102 to assist in acquisition of the satellite signals, computation of position, or both.

The server 102 uses various measurements and information associated with the constellation (hereinafter referred to as "satellite tracking information") to generate the aiding data delivered to the remote receiver 104. The server 102 receives the satellite tracking information from an external source, such as a network of satellite signal receivers ("reference network 110"), a satellite control station 112 (e.g., the Master Control Station in GPS), or other source of such information (e.g., via the Internet). The reference network 110 may include several tracking stations that collect satellite tracking information from all the satellites in the constellation, or a few tracking stations, or a single tracking station that only collects satellite tracking information for a particular region of the world. The satellite tracking information includes, for example, at least one of the satellite navigation message (e.g., ephemeris), code phase measurements, carrier phase measurements, and Doppler measurements. In one embodiment of the invention, the server 102 receives the ephemeris portion of the satellite navigation data for at least the plurality of satellites 105. An exemplary system for distributing ephemeris data is described in U.S. Pat. No. 6,411,892, issued Jun. 25, 2002, which is incorporated by reference herein in its entirety. An exemplary system for obtaining ephemeris information directly from a satellite control station is described in U.S. patent application Ser. No. 10/081,164, filed Feb. 22, 2002, which is incorporated by reference herein in its entirety.

The aiding data generated using the satellite tracking information may be valid for a short, medium, or long duration and contains information to assist in acquiring satellite signals and/or computing position. For example, the aiding data may comprise acquisition assistance data, such as code phase and Doppler measurements or a model of expected pseudoranges at the remote receiver 104 ("pseudorange model"). An exemplary system for distributing and using a pseudorange model to acquire satellite signals is described in U.S. Pat. No. 6,453,237, issued Sep. 17, 2002, which is incorporated by reference herein in its entirety. In another example, the aiding data may comprise ephemeris information or a long term orbit model. An exemplary system for distributing and using ephemeris information or a long term orbit model is described in U.S. Pat. No. 6,542,820, issued Apr. 1, 2003, which is incorporated by reference herein in its entirety.

Regardless of the type of aiding data, if the satellite tracking information upon which the aiding data is based becomes invalid, the remote receiver 104 may not be able to adequately acquire satellite signals or compute position using the aiding data, or may compute positions with accuracy that is severely degraded. As such, in one embodiment of the invention, the server 102 monitors the integrity of the aiding data in use by the remote receiver 104. As described in detail below, the server 102 obtains satellite tracking data and generates integrity data for the aiding data using the satellite tracking data. The satellite tracking data obtained by the server 102 is more current than the aiding data. The integrity data produced by the server 102 may then be transmitted to the remote device 104.

Figure 2:
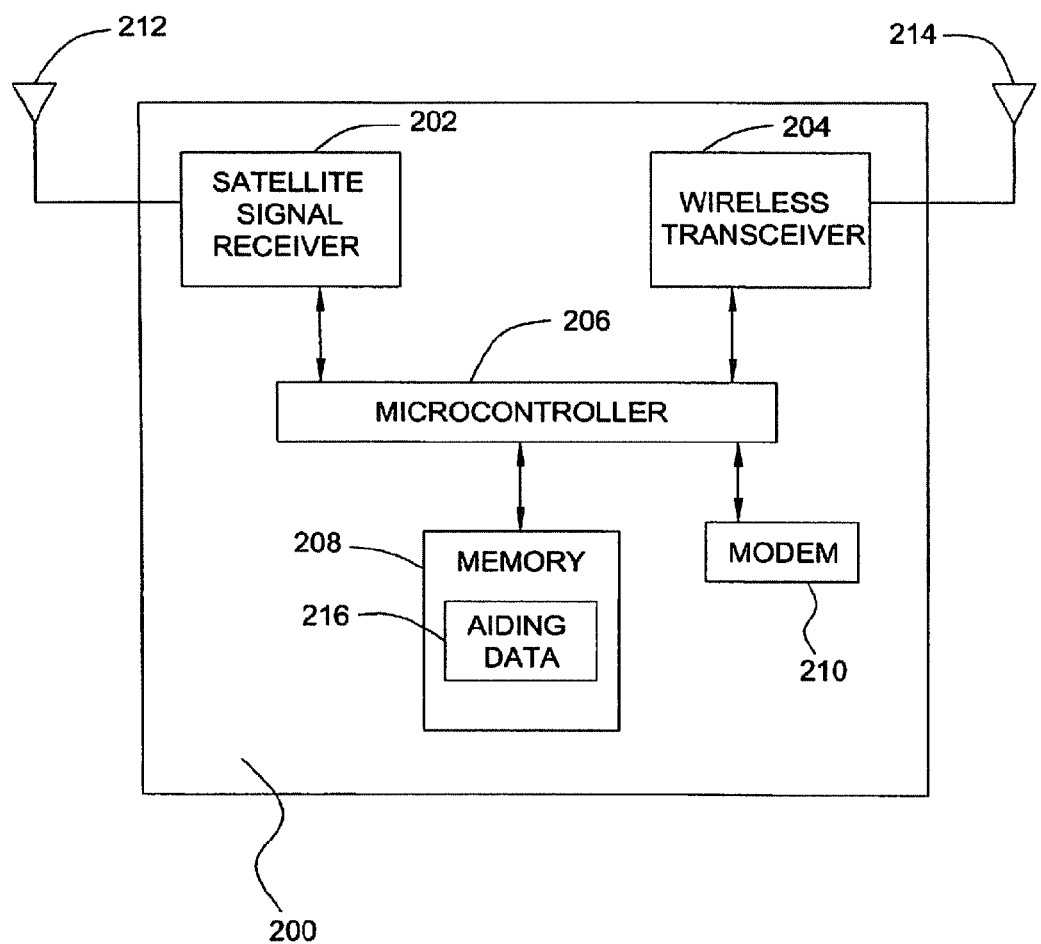
FIG. 2 is a block diagram depicting an exemplary embodiment of a satellite positioning system receiver for use with the position location system of FIG. 1.

FIG. 2 is a block diagram depicting an exemplary embodiment of a satellite positioning system receiver 200. The receiver 200 may be used as the remote receiver 104 shown in FIG. 1. The receiver 104 illustratively comprises a satellite signal receiver 202, a wireless transceiver 204, a microcontroller 206, a memory 208, and a modem 210 (or other communication port). The satellite signal receiver 202 receives satellite signals via an antenna 212. The satellite signal receiver 202 processes the satellite signals to form pseudoranges in a well-known manner. An exemplary assisted GPS receiver that may be used with the invention is described in U.S. Pat. No. 6,453,237. The pseudoranges may be coupled to the wireless transceiver 204 through the microcontroller 206. The wireless transceiver 204 may transmit the pseudoranges for a position computation in a server using an antenna 214. Alternatively the pseudoranges may be stored within the memory 208 for position computation by the receiver 200.

The memory 208 may be random access memory, read only memory, removable storage, hard disc storage, or any combination of such memory devices. The memory 208 may store aiding data 216 delivered by a server that can be used to assist in the acquisition of satellite signals or the computation of position or both. The aiding data 216 may be received via wireless link using the wireless transceiver 204, or via a computer network (e.g., Internet) using the modem 210 (or other communication port that connects the device to a computer network).

Figure 3:
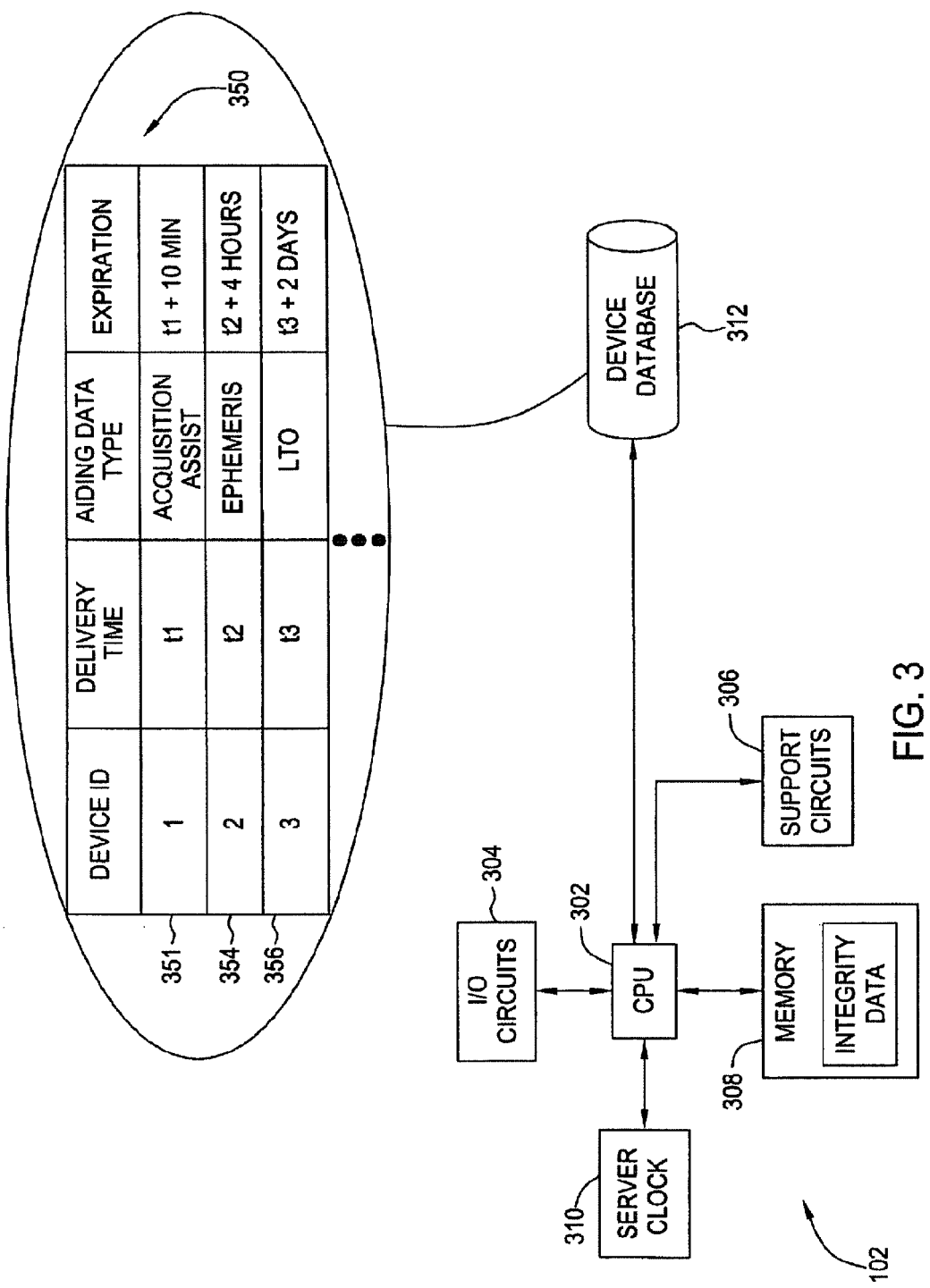
FIG. 3 is a block diagram depicting an exemplary embodiment of a satellite positioning system server for use with the position location system of FIG. 1.

FIG. 3 is a block diagram depicting an exemplary embodiment of a satellite positioning system server 300. The server 300 may be used as the server 102 shown in FIG. 1. The server 300 illustratively comprises a central processing unit (CPU) 302, input/output (I/O) circuits 304, support circuits 306, a memory 308, and a server clock 310. The server 300 may include or be coupled to a device database 312. The support circuits 306 comprise well-known circuits that facilitate operation of the CPU 202, such as clock circuits, cache, power supplies, and the like. The memory 308 may be random access memory, read only memory, removable storage, hard disc storage, or any combination of such memory devices. The server clock 310 may be used to provide a time-tag to indicate the time-of-arrival of pseudoranges transmitted by a remote receiver.

Satellite tracking information (e.g., ephemeris, code phase measurements, carrier phase measurements, Doppler measurements) is received from an external source of such information (e.g., reference network, satellite control station, Internet) using the I/O circuits 304. The server 300 uses the satellite tracking information to compute aiding data for use by remote devices. In order to monitor the integrity of the aiding data delivered to the remote receivers, the server 300 keeps track of what type of aiding data was distributed to which remote receiver, at what time, and when such aiding data will expire. In one embodiment, a table 350 may be stored within the device database 312 having entries (e.g., three are shown) defined by a remote device ID, the time-of-day that the aiding data was delivered to the remote device, the type of aiding data delivered, and the expiration time of the aiding data. For example, an entry 352 indicates that acquisition assistance data was delivered to a device having an ID of "1" at time t1 and that the acquisition assistance data is set to expire 10 minutes from t1. An entry 354 indicates that ephemeris data was delivered to a device having an ID of "2" at time t2 and that the ephemeris data is set to expire four hours from t2. An entry 356 indicates that long term orbit (LTO) data was delivered to a device having an ID of "3" at time t3 and that the LTO data is set to expire two days from t3. The server 300 monitors the integrity of the aiding data in use by the remote devices identified in the device database 312 to produce integrity data 314. The integrity data 314 may be stored in the memory 308 and transmitted to the remote devices, as described below.

Figure 4:
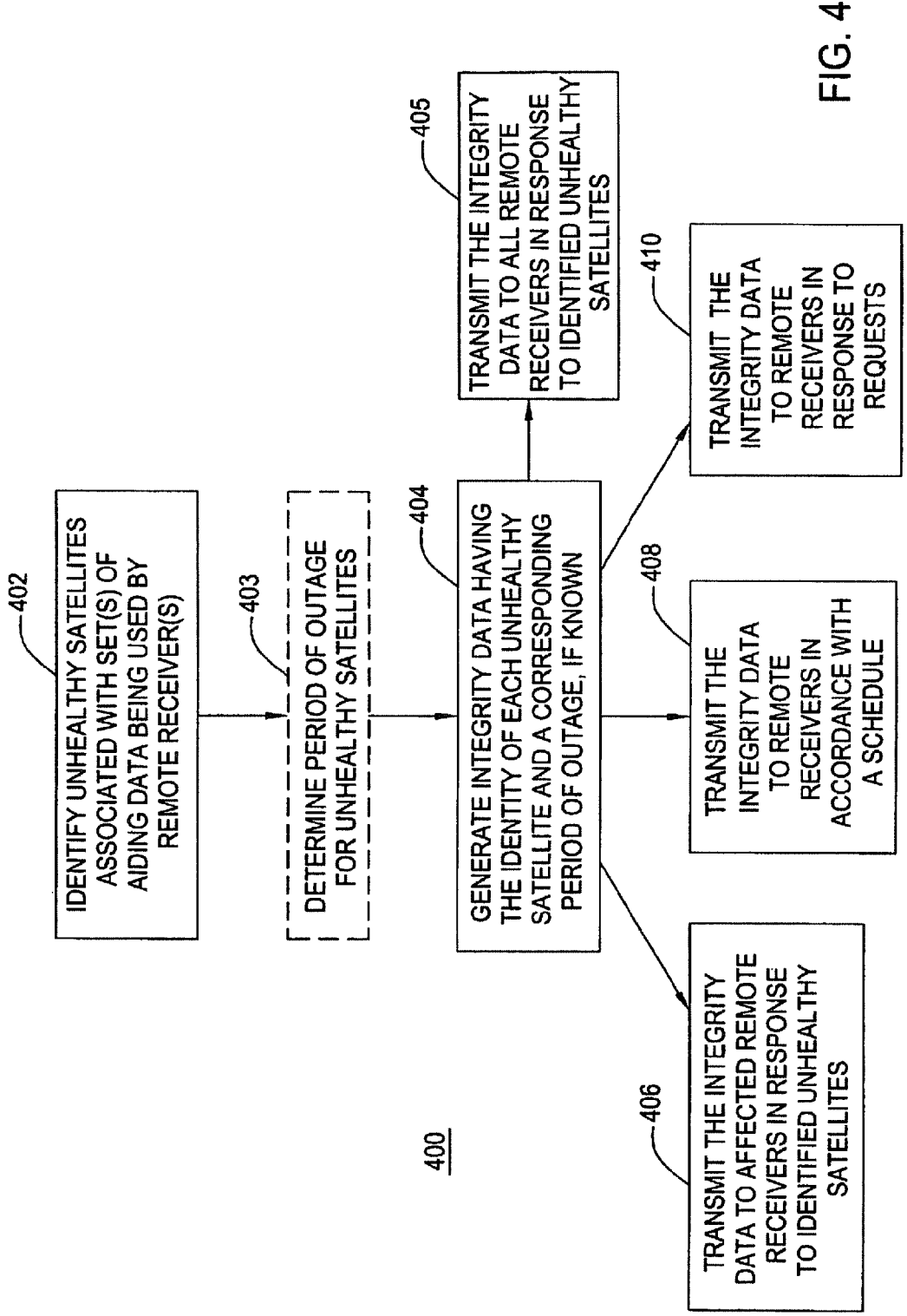
FIG. 4 is a flow diagram depicting an exemplary embodiment of a process for monitoring the integrity of satellite tracking data used by a remote receiver in accordance with the invention.

FIG. 4 is a flow diagram depicting an exemplary embodiment of a process 400 for monitoring the integrity of satellite tracking data used by a remote receiver in accordance with the invention. The process 400 may be executed by a satellite positioning system server to monitor the integrity of aiding data in use by satellite positioning system receivers. The process 400 begins at step 402, where unhealthy satellites associated with one or more sets of aiding data used by remote receivers are identified. For example, one or more of the processes 500, 600, 700, and 900 described below may be used to identify unhealthy satellites.

At optional step 403, a period of outage is determined for each identified unhealthy satellite. For example, a period of outage for each identified unhealthy satellite may be obtained from outage notification data generated by a satellite control station, as discussed below with respect to the process 900 of FIG. 9. At step 404, integrity data is generated that includes the identity of each unhealthy satellite and a corresponding period of outage, if known. If outage periods are unknown, then the integrity data may include no period of outage or the period of outage may be set to a pre-defined value or to a value based on the particular type of aiding data in use (e.g., four hours if the aiding data is valid for four hours).

The integrity data may then be transmitted to the remote receivers using the sets of aiding data. In one embodiment of the invention, at step 406, the integrity data may be transmitted to affected remote receivers in response to identified unhealthy satellites. That is, if any satellites were identified as being unhealthy, the integrity data is transmitted to the remote receivers having aiding data that is affected by such unhealthy satellites. Thus, the integrity data is only sent when unhealthy satellites are identified and only sent to the remote receivers affected by such identified unhealthy satellites. In another embodiment, at step 405, the integrity data may be transmitted to all remote receivers in response to identified unhealthy satellites. In another embodiment, at step 408, the integrity data is transmitted to remote receivers in accordance with a pre-defined transmission schedule. For example, the integrity data may be broadcast to all remote receivers using the sets of aiding data periodically whether unhealthy satellites have been identified or not. In yet another embodiment, at step 410, the integrity data may be transmitted to remote receivers in response to requests from the remote receivers.

Figure 5:
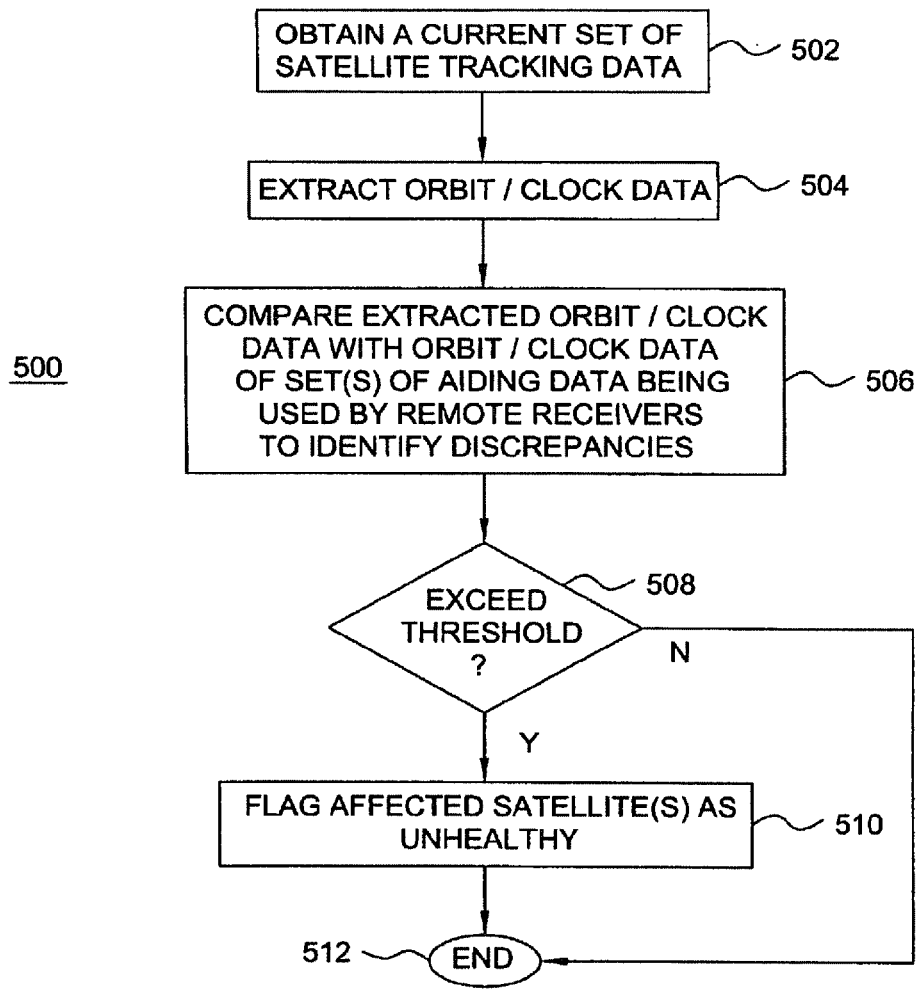
FIG. 5 is a flow diagram depicting an exemplary embodiment of a process for identifying unhealthy satellites in accordance with the invention.

FIG. 5 is a flow diagram depicting an exemplary embodiment of a process 500 for identifying unhealthy satellites in accordance with the invention. The process 500 begins at step 502, where a current set of satellite tracking data is obtained. The current set of satellite tracking data may be received from a reference network, a satellite control station, and/or other source of information, such as over the Internet. At step 504, satellite orbit data, satellite clock data, or both (hereinafter generally referred to as orbit/clock data) is extracted from the satellite tracking data. At step 506, the orbit/clock data is compared with orbit/clock data of one or more sets of aiding data being used by remote receivers to identify discrepancies. For example, a satellite's orbit may have changed, or a satellite's clock may have drifted, since the time the aiding data was generated. Thus, there may be a discrepancy between the orbit/clock data extracted from the current set of satellite tracking data and the orbit/clock data underlying the aiding data.

At step 508, a determination is made as to whether any identified discrepancies exceed a pre-defined threshold. For example, a satellite's orbit may have changed beyond a pre-defined threshold, or a satellite's clock may have drifted outside a pre-defined threshold. If so, the process 500 proceeds to step 510. Otherwise, the process 500 ends at step 512. At step 510, the one or more affected satellites associated with the identified discrepancies are flagged as being unhealthy.

Figure 6:
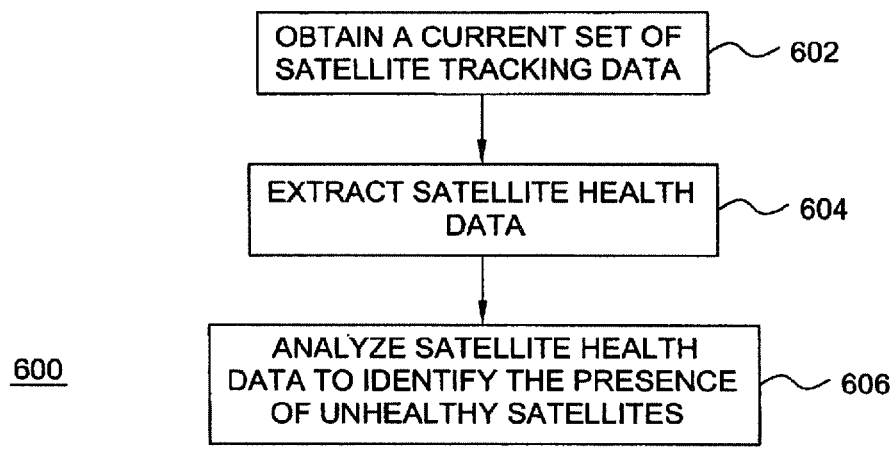
FIG. 6 is a flow diagram depicting another exemplary embodiment of a process for identifying unhealthy satellites in accordance with the invention.

FIG. 6 is a flow diagram depicting another exemplary embodiment of a process 600 for identifying unhealthy satellites in accordance with the invention. The process 600 begins at step 602, where a current set of satellite tracking data is obtained. The current set of satellite tracking data may be received from a reference network, a satellite control station, and/or other source of information, such as over the Internet. At step 604, satellite health data is extracted from the current set of satellite tracking data. As described above, ephemeris contains precise satellite orbit and time model information for a particular satellite. In addition, the ephemeris also contains an indication of satellite health ("health status"). In GPS, for example, changes in ephemeris are announced by the MCS by changing the health status in the broadcast ephemeris. At step 606, the satellite health data is analyzed to identify the presence of unhealthy satellites.

Figure 7:
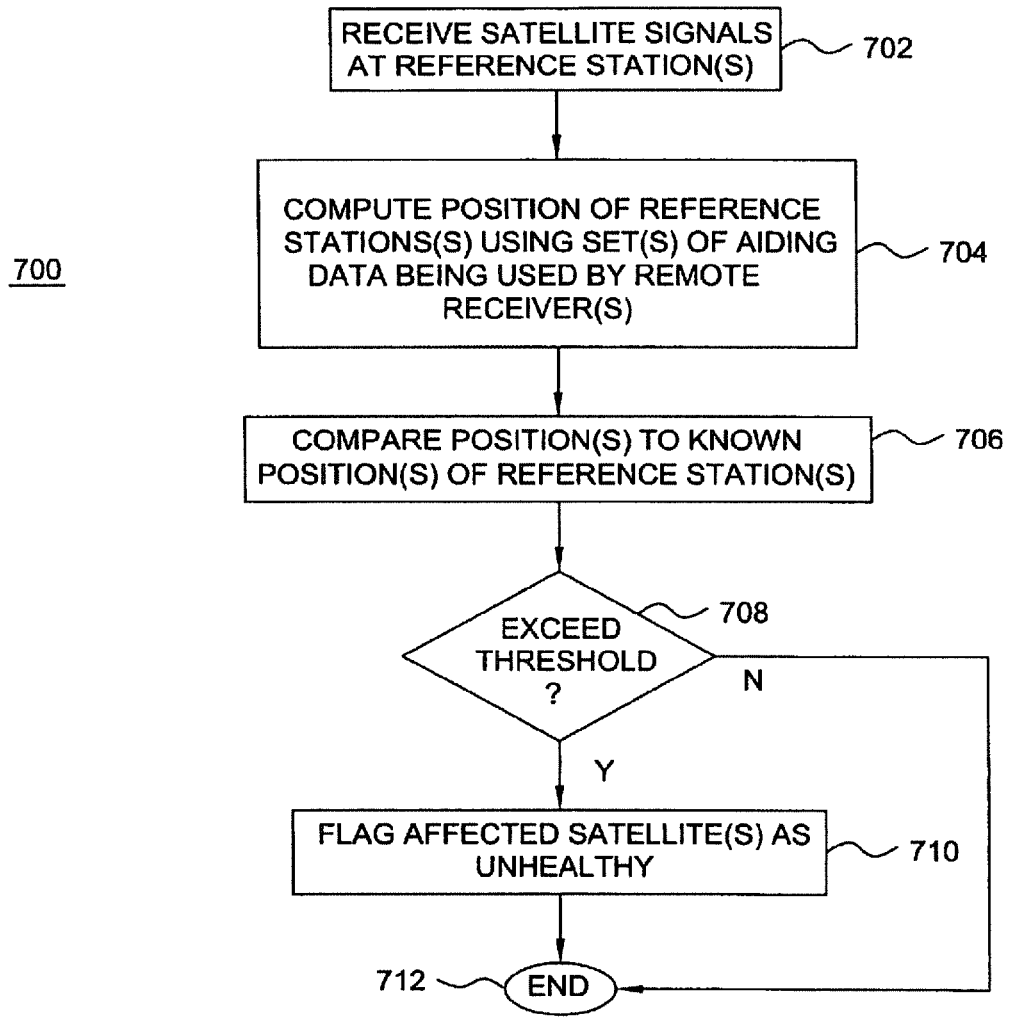
FIG. 7 is a flow diagram depicting yet another exemplary embodiment of a process for identifying unhealthy satellites in accordance with the invention.

FIG. 7 is a flow diagram depicting yet another exemplary embodiment of a process 700 for identifying unhealthy satellites in accordance with the invention. The process 700 begins at step 702, where satellite signals are received at one or more reference stations having a known position. At step 704, a position of each reference station is computed using one or more sets of aiding data being used by the remote receivers. At step 706, the computed positions are compared to the known positions of the reference stations. If a given set of aiding data used to compute a position of a reference station is invalid due to an unhealthy satellite, the computed position will be in error. Thus, at step 708, a determination is made as to whether the computed positions exceed the respective known positions by a pre-defined threshold. If so, the process 700 proceeds to step 710. Otherwise, the process 700 ends at step 712. At step 710, the one or more affected satellites associated with the identified discrepancies are flagged as being unhealthy.

Figure 8:
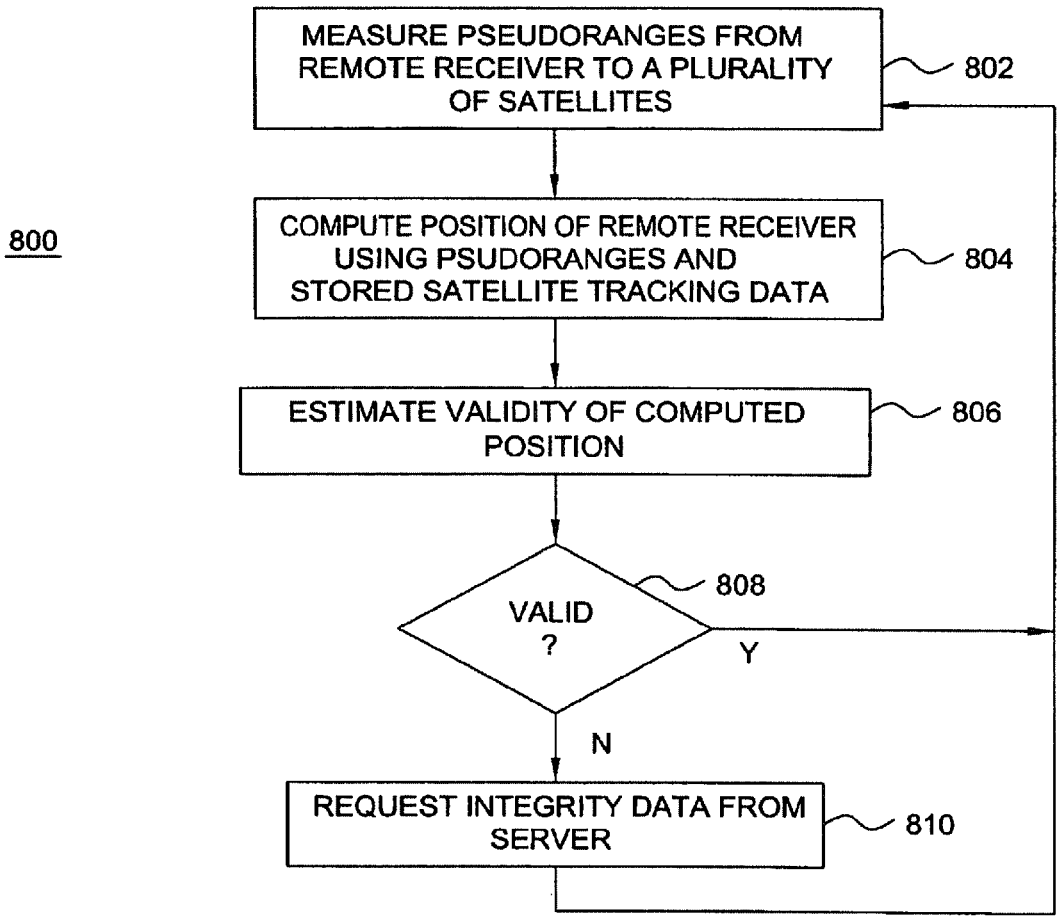
FIG. 8 is a flow diagram depicting an exemplary embodiment of a process for requesting integrity data from a server in accordance with the invention.

FIG. 8 is a flow diagram depicting an exemplary embodiment of a process 800 for requesting integrity data from a server in accordance with the invention. The process 800 begins at step 802, where pseudoranges are measured from a remote receiver to a plurality of satellites. At step 804, a position of the remote receiver is computed using the pseudoranges and satellite tracking data stored within the remote receiver. For example, the satellite tracking data may be aiding data delivered by a server. At step 806, the validity of the computed position is estimated. There are many well-known techniques in which the validity of the computed position may be estimated. For example, a-posteriori residuals may be formed that are associated with the measured pseudoranges. The a-posteriori residuals may be analyzed to identify any erroneous pseudoranges. If any of the pseudoranges are found to be erroneous, the computed position is estimated to be invalid. Other techniques may be used for estimating validity. For example, expected pseudoranges (based on the a-priori position and time and the satellite tracking data stored in the remote receiver) may be compared with measured pseudoranges to yield a-priori pseudorange residuals. A-priori pseudorange residuals above a particular threshold may indicate invalid satellite tracking data. Another example of estimating validity is to compare computed position with a-priori position. A position difference above a particular threshold may indicate invalid satellite tracking data. Other examples may use variations of these methods (comparing computed and expected altitudes, times, etc), as well as any combination of these methods.

At step 808, a determination is made as to whether the computed position is valid. If so, the process 800 returns to step 802 and may be repeated. Otherwise, the process 800 proceeds to step 810, where integrity data is requested from the server. The integrity data may be used to determine whether the satellite tracking data stored within the remote receiver is still valid.

Figure 9:
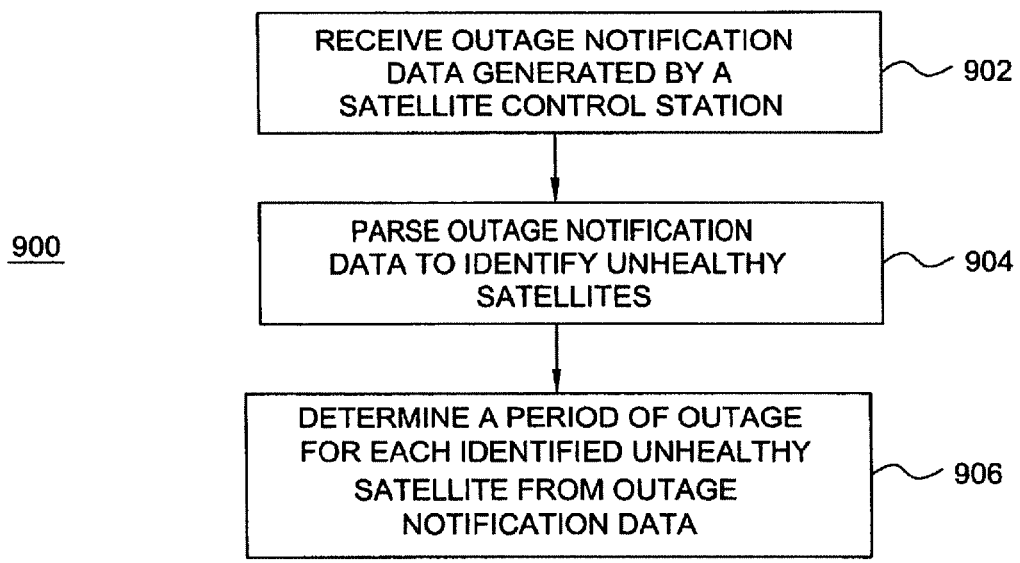
FIG. 9 is a flow diagram depicting another exemplary embodiment of a process for identifying unhealthy satellites in accordance with the invention.

FIG. 9 is a flow diagram depicting another exemplary embodiment of a process 900 for identifying unhealthy satellites in accordance with the invention. The process 900 begins at step 902, where outage notification data generated by a satellite control station is received. For example, the outage notification data may be received directly from the satellite control station, or via some other source, such as over the Internet. For example, in GPS, the satellite constellation is monitored by stations around the world under control of a Master Control Station (MCS). The MCS announces satellite outages that are either planned for the future, or unplanned and immediate, by providing Notice Advisories to Navstar Users (NANUs) on the Internet.

At step 904, the outage notification data is parsed to identify unhealthy satellites. At step 906, a period of outage for each identified unhealthy satellite is determined. For example, a period of outage for an identified unhealthy satellite may be obtained from NANUs. By using outage notification data, the invention ensures that aiding data in use by remote receivers always reflects the most current integrity status of the GPS constellation, regardless of whether the changes in integrity were planned for the future, or unplanned and immediate.

Although the methods and apparatus of the invention have been described with reference to GPS satellites, it will be appreciated that the teachings are equally applicable to positioning systems that utilize pseudolites or a combination of satellites and pseudolites. Pseudolites are ground-based transmitters that broadcast a PN code (similar to the GPS signal) that may be modulated on an L-band carrier signal, generally synchronized with GPS time. The term "satellite", as used herein, is intended to include pseudolites or equivalents of pseudolites, and the term "GPS signals", as used herein, is intended to include GPS-like signals from pseudolites or equivalents of pseudolites.

Moreover, in the preceding discussion, the invention has been described with reference to application upon the United States Global Positioning System (GPS). It should be evident, however, that these methods are equally applicable to similar satellite systems, and in particular, the Russian Glonass system and the European Galileo system. The term "GPS" used herein includes such alternative satellite positioning systems, including the Russian Glonass system and the European Galileo system.

While the foregoing is directed to illustrative embodiments of the present invention, other and further embodiments of the invention may be devised without departing from the basic scope thereof, and the scope thereof is determined by the claims that follow.

We claim:

1. A method comprising:
   receiving at a server a first ephemeris;
   using the first ephemeris to produce integrity data; and
   transmitting the integrity data to a remote receiver for validating a second ephemeris at the remote receiver.

2. The method of claim 1, further comprising:
   using the first ephemeris to produce other integrity data for validating a third ephemeris residing at the remote receiver; and
   transmitting to the remote receiver the other integrity data.

3. The method of claim 1, further comprising:
   receiving, at the server, additional ephemeris at a time after receiving the first ephemeris; and
   using the additional ephemeris to maintain a reliability of the integrity data.

4. The method of claim 1, further comprising:
   receiving satellite signals at a reference station;
   using the satellite signals and the second ephemeris to compute a computed position of the reference station;
   determining an error in position of the reference station as a function of the computed position and a known position of said reference station; and
   using the error in position to maintain a reliability of the integrity data.

5. The method of claim 4, wherein determining the error in position of the reference station comprises determining a deviation between the computed and known positions.

6. The method of claim 1, wherein the first ephemeris comprises at least one of first orbit data and first clock data, and wherein the second ephemeris comprises at least one of second orbit data and second clock data.

7. The method of claim 6, wherein using the first ephemeris to produce integrity data comprises at least one of:
   identifying an orbit discrepancy as a function of the first and second orbit data; and
   identifying a clock discrepancy as a function of the first and second clock data.

8. The method of claim 7, wherein using the first ephemeris to produce integrity data further comprises using at least one of the orbit and clock discrepancies to maintain a reliability of the integrity data, and wherein transmitting the integrity data to the remote receiver comprises transmitting to the remote receiver, in response to at least one of the orbit and clock discrepancies exceeding a corresponding threshold, the integrity data.

9. The method of claim 1, further comprising:
   receiving at the server health data for at least one satellite, and using the health data to maintain a reliability of the integrity data.

10. The method of claim 9, wherein the health data includes an indication of a given satellite that is unhealthy, and wherein using the health data to maintain the reliability of the integrity data comprises modifying the integrity data to reflect that the given satellite is unhealthy.

11. The method of claim 10, wherein transmitting to the remote receiver the integrity data comprises transmitting to the remote receiver, in response to the indication, the integrity data.

12. The method of claim 1, wherein receiving at the server the first ephemeris comprises receiving at the server, from at least one of a network of reference stations and a satellite control station, the first ephemeris.

13. A satellite-positioning-system server comprising:
   a receiver for receiving a first ephemeris;
   a processor adapted to use the first ephemeris to produce integrity data; and
   a transmitter for transmitting the integrity data to a remote receiver for validating a second ephemeris at the remote receiver.

14. The server of claim 13, further comprising a database adapted to store an identity of the remote receiver in which the second ephemeris resides.

15. A satellite-positioning-system server comprising:
   memory, and processing logic, wherein the processing logic is adapted to:
     receive a first set of satellite tracking data, wherein the first satellite tracking data includes at least one of ephemeris for at least one satellite in a constellation of satellites;
     use the first set of satellite tracking data to produce integrity data; and
     transmit the integrity data to a remote receiver for validating a second set of satellite tracking data at the remote receiver.

16. The server of claim 15, wherein first set of satellite tracking data comprises at least one of a pseudorange model, ephemeris, and long term satellite orbit data for at least one satellite in a constellation of satellites, and wherein the second set of satellite tracking data comprises at least one of a pseudorange model, ephemeris, and long term satellite orbit data for at least one of the satellites.

17. The server of claim 15, wherein the processor is further adapted to:
   receive health data for the at least one satellite, and use the health data to maintain a reliability of the integrity data.

18. The server of claim 15, wherein the processor is further adapted to:
   receive an outage notification for the at least one satellite, and use the outage notification to maintain a reliability of the integrity data.

* * * * *

UNITED STATES PATENT AND TRADEMARK OFFICE
CERTIFICATE OF CORRECTION

PATENT NO. : 8,514,126 B2
APPLICATION NO. : 12/539258
DATED : August 20, 2013
INVENTOR(S) : van Diggelen et al.

Page 1 of 1

It is certified that error appears in the above-identified patent and that said Letters Patent is hereby corrected as shown below:

In the Specification

Column 1, line 10, "application Ser. No." should be replaced with --application No.--.

Column 1, line 11, "U.S. Pat. No." should be replaced with --U.S. Patent No.--.

Column 1, line 12, "application Ser. No." should be replaced with --application No.--.

Column 1, line 13, "U.S. Pat. No." should be replaced with --U.S. Patent No.--.

Signed and Sealed this
Third Day of December, 2013

Margaret A. Focarino
*Commissioner for Patents of the United States Patent and Trademark Office*